April 1, 1952 — R. R. KILIAN — 2,591,161
RETAINER FOR ROLLER BEARINGS
Filed May 22, 1948
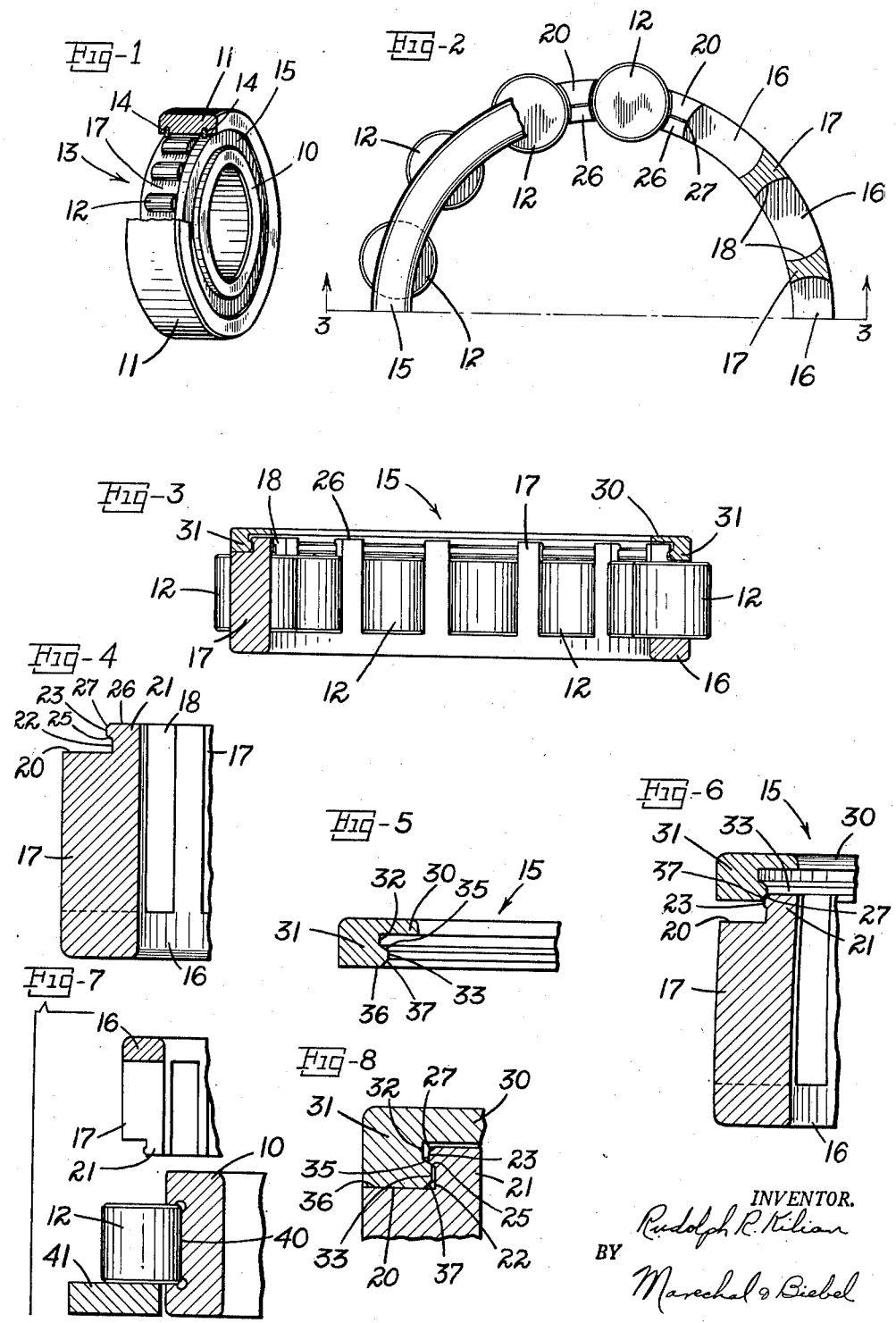
INVENTOR.
Rudolph R. Kilian
BY Marechal & Biebel
ATTORNEYS Patented Apr. 1, 1952

2,591,161

UNITED STATES PATENT OFFICE 2,591,161

RETAINER FOR ROLLER BEARINGS

Rudolph R. Kilian, Baldwinsville, N. Y., assignor to Rollway Bearing Company, Inc., Syracuse, N. Y., a corporation of New York Application May 22, 1948, Serial No. 28,681

4 Claims. (Cl. 308—217)

This invention relates to roller bearings, and more particularly to a retainer or cage for roller bearings of the precision type which include a cage of substantial radial dimensions for separating and guiding the rollers.

The invention has for its principal object the provision of a two-piece retainer or cage for a roller bearing of the above type wherein the component parts are economical to produce and easy to assemble by simple axial movement towards each without requiring drilling, riveting, welding or like operations, and wherein the parts include complementary portions which interlock with a camming action in the assembled position of the retainer to effect a firm interconnection between the parts without developing stresses therein tending to cause misalignment or relative disconnection.

Other objects and advantages will appear from the following description, the accompanying drawing and the appended claims.

In the drawing:

Fig. 1 is a perspective view, partly broken away, showing a complete roller bearing incorporating a retainer or cage in accordance with the invention;

Fig. 2 is a partial end view of the retainer, the view being partly in elevation and partly broken away at different levels;

Fig. 3 is a sectional view on the line 3—3 of Fig. 2;

Fig. 4 is a fragmentary view on a larger scale through one of the guide fingers of the body member;

Fig. 5 is a similar fragmentary sectional view through the end ring of the retainer;

Fig. 6 is a fragmentary view illustrating an intermediate stage in the assembly of the two parts of the retainer;

Fig. 7 is a fragmentary and somewhat diagrammatic view illustrating the asembling of the retainer with the rollers and the inner roll; and Fig. 8 is an enlarged view of a portion of Fig. 3.

Referring to the drawing, which illustrates a preferred embodiment of the invention, the complete bearing shown in Fig. 1 includes an inner race 10, an outer race 11 and a plurality of rollers 12 arranged and separated in guided relation by a retainer or cage identified generally by the reference character 13 and held in place between the two races by a pair of snap rings 14.

The retainer 13 is composed of an end ring 15 and a body member which includes an annular end portion 16 and a plurality of guide fingers 17 integrally formed with the end portion 16 and extending axially therefrom in angularly spaced relation to form pockets for the rollers 12, satisfactory results having been obtained with both of these parts formed of materials such as bronze alloy, copper and aluminum alloys, steel and plywood and other fiber materials. As shown in Fig. 2, the sides 18 of fingers 17 are cylindrically concave to form guide surfaces for the rollers.

The end ring 15 and fingers 17 have axially and radially overlapping complementary portions which cooperate to lock the ring to the body member. Referring to Fig. 4, the outer edge of each finger is cut away to form a transverse shoulder 20 and a latch portion 21 extending axially beyond this shoulder. The radially outer surface of latch portion 21 includes a cylindrically convex portion 22 adjacent shoulder 20 and a cylindrically convex portion 23 of greater radius than portion 22 and connected therewith by a beveled or tapered portion 25, satisfactory results having been obtained with this tapered portion arranged at an angle of the order of 70° to the axis of the device. The outer edge of latch portion 21, between the outer end 26 thereof and the cylindrical portion 23, is beveled as indicated at 27, an angle of the order of 45° having been found satisfactory.

The end ring 15 is continuous and includes portion 30 of substantially the same end surface dimensions as the corresponding outer end surface of the body portion 16, and it also includes a portion 31 of greater inner diameter than the portion 30, which is adapted to telescope with the latch portions 21 of fingers 17. The ring portion 31 includes cylindrically concave portions 32 and 33 (Fig. 5) of respectively greater and lesser inner diameter which are connected by a portion 35 beveled or tapered in the opposite direction from the portions 25 of fingers 17 but at substantially the same angle as the portions 25 to form a complementary surface for camming engagement with the portions 25 to lock the parts together when assembled with the rollers 12. The cylindrical portion 33 of the ring is connected axially with the inner end 36 of the ring portion 31 by a beveled or tapered portion 37, an angle of 45° having been found a satisfactory degree of taper for this surface 37.

The relative dimensions of these portions of the ring and the body member are so correlated and proportioned that the two parts will readily move axially together to a position of radially and axially overlapping relation of the surfaces 25 and 35 substantially without stresses tending to cause misalignment or disconnection. Thus referring to Fig. 6, the inner radius of the portion 33 of the ring is less than the outer radius of the cylindrical portions 23 of the fingers so that when the parts are first positioned in end to end relation, the beveled edges 27 of the fingers will be in contact with the beveled surface 37 of the ring. Accordingly, when pressure is exerted axially of the parts to force them together, the portions 27 and 37 will cooperate to cam and flex fingers 17 inwardly until the surfaces 33 and 23 are in overlapping contact. Continued axial movement of the parts will then cause the surfaces 23 and 33 to slip past each other, thus permitting the fingers to move radially outwardly as a result of their own resiliency into positions wherein the surfaces 25 and 35 overlap, as shown in Figs. 3 and 8.

Fig. 7 illustrates the operation of assembling this retainer with an inner race 10 having a channeled groove 40 for receiving the rollers 12. The race is mounted within an annular fixture or jig 41 of substantially the same thickness as one wall of the channel 40, and the proper number of rollers are then assembled in equally spaced relation in channel 40, the radially outer portions of the rollers being supported by fixture 41. The body member 16—17 of the retainer is then fitted in place from above with each of the rollers being received within a pocket between fingers 17. The entire assembly is then turned over, the fixture 41 serving to retain the rollers in their pockets during this step. Thereafter, the fixture 41 is removed and the ring 15 fitted and snapped into place to complete the assembly operation. Substantially the same procedure may be followed in assembling the retainer and rollers with an outer race having a double-walled channel with the exception that the jig or fixture for such operation will be of such diameter as to fit within the race. In either case, the sub-assembly can then be assembled with the other race by means of snap rings 14 as in Fig. 1 or in any other conventional way.

The retainer of the invention may also be assembled with inner and outer races both of which have double walled channels for the rollers as shown in Fig. 7, in substantially the same manner as such assembling operation is commonly carried out with retainers previously available for this type of bearing. Thus the races are first assembled in eccentric relation and the rollers loaded in place through the widest portion of the resulting crescent-shaped intermediate space. The rollers and races are then adjusted to equi-spaced, concentric relation, and the retainer is then assembled therewith in essentially the same manner as already described.

The combined length axially of the portions 33 and 37 of the ring 15 is not less, and is preferably greater, than the axial length of the surfaces 22 of the fingers to assure firm camming engagement between the surfaces 25 and 35 for drawing the ring and fingers firmly together. For example, in a cage having an inner diameter of 3.342 inches, an outer diameter of 4.020 inches and thirteen equally spaced pockets for rollers, satisfactory results have been obtained with an axial length of the surface 37 equal to 0.03125 inch and a combined axial length for the surfaces 33 and 37 equal to 0.062±0.001 inch, as compared with an axial length for the surface 22 equal to 0.060±0.001 inch. Accordingly, when the parts are assembled as shown in Figs. 3 and 8, the natural resiliency of the fingers will cause them to return to positions of substantially parallelism with the axis of the device, and the camming engagement of the interlocking surfaces 25 and 35 will thus draw the parts axially together to the limit permitted by the seating of the end suface 36 of the ring on the shoulders 20 at the outer ends of the fingers.

The dimensions of the overlapping portions of the parts are also predetermined to provide clearances preventing undesirable stresses which might cause misalignment or unlocking. Thus satisfactory results have been obtained in a retainer of the above size with the outer diameter of the surfaces 22 of the fingers held to a maximum of 3.620 inches as compared with a minimum inner diameter of 3.326 inches for the surface 33 of the ring to assure radial clearance between the surfaces 22 and 33 when the parts are assembled, as shown most clearly in Fig. 8. Similarly in this example, the outer diameter of the surfaces 23 of the fingers is held to a maximum of 3.365 inches as opposed to an inner diameter of substantially 3.6875 inches for the surface 32 of the ring to assure similar radial clearance between these surfaces as shown in Fig. 8. It will be seen that these clearances coupled with the relation of the axial dimensions of the portions 22 and 33—37 assure the desired firm camming engagement of the portions 25 and 35.

It will be noted that clearance is provided between the ends 26 of the fingers and the adjacent surface of the ring portion 30, satisfactory results having been obtained in a retainer of the above size with the axial length of the latch portions 21 of the fingers equal to 0.125 inch as opposed to a corresponding dimension of 0.135 inch for the ring portion 31. It will also be seen that the combined cross sectional area of the ring and the latch portion 21 of one finger is substantially equal to the cross sectional area of the body portion 16 to assure proper balance between opposite ends of the assembled device.

Retainers constructed in accordance with the invention as described and shown have been found satisfactory in operation for the purposes for which the general type of precision roller bearing shown in Fig. 1 is used and may be provided in the proper sizes in which such bearings are required. In addition, these retainers have substantial advantages of easy manufacture and assembly. Thus retainers of this type have previously been assembled by drilling holes axially through the guide fingers and through the end ring and ring portion of the body member, and then securing the parts together by means of rivets inserted in such holes. The drilling and assembling operations with this construction of retainer require considerable time and labor, and in contrast therewith, all portions of the retainer of the present invention are readily formed by simple machining operations, and the assembling of the retainer and rollers requires minimum time and effort.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A roller bearing retainer of the character described comprising a body member including a closed annular portion, a plurality of guide fingers integrally formed with said annular portion and extending axially therefrom in circumferentially spaced relation to form pockets for receiving rollers therebetween, a closed ring member adapted to be received over the ends of said fingers opposite said annular portion of said body to close the ends of said pockets, said ring and each said finger including portions adapted to cooperate in axially and radially overlapping relation for locking said members together, said fingers being resiliently deformable to provide for relative movement of said members into assembled relation, said radially overlapping portions of said members having complementary beveled surfaces cooperating in relative camming engagement to effect firm retention of said members in assembled relation, the radial dimensions of said overlapping portions at either side axially of said beveled surfaces being correlated to provide radial clearance between said fingers and said ring at either side axially of said beveled surfaces assuring firm camming engagement of said beveled surfaces.

2. A roller bearing retainer of the character described comprising a body member including a closed annular portion, a plurality of guide fingers integrally formed with said annular portion and extending axially therefrom in circumferentially spaced relation to form pockets for receiving rollers therebetween, a closed ring member adapted to be received over the ends of said fingers opposite said annular portion of said body to close the ends of said pockets, said ring and each said finger including portions adapted to cooperate in axially and radially overlapping relation for locking said members together, said fingers being resiliently deformable to provide for relative movement of said members into assembled relation, said radially overlapping portions of said members having complementary beveled surfaces cooperating in relative camming engagement to effect firm retention of said members in assembled relation, said ring having an oppositely beveled surface located axially inwardly of said retainer from said beveled surface thereon, and each said finger having a beveled edge portion located axially outwardly of said beveled surface thereof adapted to cooperate with said oppositely beveled surface on said ring when said members are pressed axially together to facilitate deformation of said fingers and relative axial movement of said members into assembled relation.

3. A roller bearing retainer of the character described comprising a body member including a closed annular portion, a plurality of guide fingers integrally formed with said annular portion and extending axially therefrom in circumferentially spaced relation to form pockets for receiving rollers therebetween, a ring member adapted to be received over the outer ends of said fingers opposite said annular portion of said body to close the ends of said pockets, each said finger including a latch portion extending axially therefrom at the outer end thereof of lesser outer radius than the remainder of said finger to provide a transverse shoulder portion adapted to abut said ring, said ring including an axially inner portion adapted to telescope with said latch portions, said telescoping portions of said ring and said fingers including complementary beveled surfaces adapted to engage in camming relation locking said ring and said fingers together, said beveled surface of each said latch portion being axially spaced from said shoulder to leave an intermediate cylindrically convex portion, said beveled surface of said ring being axially spaced from the outer end portion of said ring to leave a cylindrically concave portion, said cylindrical portions being of respectively lesser and greater radius than the radially inner edge of said beveled ring surface and the radially outer edge of said beveled surface of said latch portion to provide radial clearance between said cylindrical position when said parts are assembled.

4. A roller bearing retainer of the character described comprising a body member including a closed annular portion, a plurality of guide fingers integrally formed with said annular portion and extending axially therefrom in circumferentially spaced relation to form pockets for receiving rollers therebetween, a ring member adapted to be received over the outer ends of said fingers opposite said annular portion of said body to close the ends of said pockets, each said finger including a latch portion extending axially therefrom at the outer end thereof of lesser outer radius than the remainder of said finger to provide a transverse shoulder portion adapted to abut said ring, said ring including an axially inner portion adapted to telescope with said latch portions, said telescoping portions of said ring and said fingers including complementary beveled surfaces adapted to engage in camming relation locking said ring and said fingers together, said beveled surface of each said latch portion being axially spaced from said shoulder by a predetermined distance, said beveled surface of said ring being spaced from the axially inner end of said ring by a distance not less than said predetermined distance to assure engagement of said beveled surfaces when said members are assembled, said latch portion of each said finger being of lesser axial dimensions than said telescoping portion of said ring to provide clearance between the outer end of said latch portion and said ring when said members are assembled.

RUDOLPH R. KILIAN.

REFERENCES CITED

The following references are of record in the file of this patent:

UNITED STATES PATENTS

| Number | Name | Date |
| --- | --- | --- |
| 1,464,666 | Slater | Aug. 14, 1923 |
| 1,738,984 | Brown | Dec. 10, 1929 |

FOREIGN PATENTS

| Number | Country | Date |
| --- | --- | --- |
| 577,965 | Great Britain | June 6, 1946 |